Patented June 28, 1938

2,121,825

UNITED STATES PATENT OFFICE 2,121,825

LUBRICANTS

Carl F. Prutton, Cleveland, Ohio, assignor, by mesne assignments, to The Lubri-Zol Development Corporation, Cleveland, Ohio, a corporation of Delaware No Drawing. Application December 31, 1934, Serial No. 760,038. Renewed August 12, 1937

1 Claim. (Cl. 87—9)

This application is a continuation in part of my co-pending applications Serial Numbers 635,701; 638,599 and 679,594 now respectively Patent Numbers 1,986,651; 1,986,645 and 2,051,744.

The above identified applications disclose the use, in the field of lubrication, of halogenated carbon ring compounds. Said applications more specifically disclose the fact that certain of the above named type of compounds, when added in very small amounts to a lubricating oil such as a mineral oil, impart "extreme pressure" characteristics thereto, i. e., a lubricating film formed of such material, when occurring between relatively moving metallic bearing surfaces is capable of withstanding considerably greater pressures per unit area, before such film is ruptured, than previously known lubricants, particularly mineral oil when used in its pure state.

This invention relates to the discovery that certain compounds, among which are included certain compounds covered by the broad class, as defined in my above identified application, are likewise particularly useful in the field of lubrication.

Certain of the compounds to which the present invention relates are particularly useful as means for imparting extreme pressure characteristics to lubricating compositions generally such as lubricating oils; as means to impart certain characteristics to lubricating compositions not ordinarily possessed thereby and also to function as primary lubricants either in their pure state or combined with other lubricating constituents.

It is a principal object of my invention, therefore, to provide, for use in the field of lubrication, certain materials having a wide variety of usage and by the use of which certain results may be obtained which have heretofore been impossible.

Other objects of my invention will appear as the description proceeds.

To the accomplishment of the foregoing and related ends, said invention, then, consists of the features hereinafter fully described, and particularly pointed out in the claim, the following description setting forth in detail certain embodiments of the invention, these being illustrative, however, of but a few of the various ways in which the principle of the invention may be employed.

Broadly stated, this invention, as previously indicated, contemplates the use in the lubricating field of such materials as may be properly defined as the products of reactions taking place in the presence of certain catalysts such as aluminum chloride, between an unsaturated organic compound and an organic ring compound.

By reference to page 2 of my copending application now Patent No. 2,051,744, of August 18, 1936, certain groups of compounds will be found which come within the scope of the present invention, namely, the halogenated, or more specifically, chlorinated homologs (i. e., compounds carrying alkyl side-chains) of benzene, naphthalene, and diphenyl, such as halogenated, or more specifically, chlorinated toluene, methyl naphthalene, and phenyl toluene.

Catalysts

The catalysts, which it is possible to employ in the formation of the products contemplated for use in the lubrication field by this invention, may be broadly defined as any catalysts which promote condensation reactions of the above type; specific examples of such catalysts are anhydrous aluminum chloride, anhydrous ferric chloride, and the addition products formed by the reaction of such anhydrous chlorides with olefines such as ethylene; for example, the addition product of anhydrous aluminum chloride and ethylene, $AlCl_3.C_2H_4$. Generally speaking, the broad class of catalysts capable of being used are those well known in the art as being substantially the equivalent of anhydrous aluminum chloride.

Unsaturated organic compounds

The unsaturated organic compounds forming one component of the condensation reaction necessary to produce the products contemplated for use by this invention in the lubricating field may be conveniently defined as compounds containing at least one pair of multiple-bonded carbon atoms, such as the groups

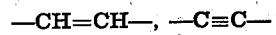

When the unsaturated organic compound is a hydrocarbon of the olefine type and the ring compound is of the aromatic type, the resultant product is probably in the nature of a homolog of the aromatic compound i. e., an alkylated aromatic compound and the reaction may be expressed as follows:—

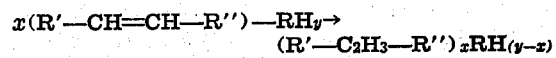

where R' and R'' are organic radicles or hydrogen and R is an aromatic radicle.

The di-olefines or other polyolefines such as those produced by polymerization of the olefines, (e. g. butylenes, pentenes, hexenes, etc.) produce similar products of a more complex nature and for certain purposes are of a preferred type. Other unsaturated organic compounds are capable of producing products of the type contemplated. A preferred type of unsaturated compound is one containing one or more long chain structures such as the normal alkyl groups which contain more than three carbon atoms and preferably more than ten; for example, the lauryl, cetyl and melissyl groups. When such "long chain" unsaturated compounds are used, it may be desirable to use $AlCl_3.C_2H_4$ as the catalyst rather than $AlCl_3$.

A complex mixture of unsaturated compounds is usually preferred to a single pure compound, and a preferred source of such compounds is found in the products of the so-called "cracking" process as applied to petroleum products; for example, cracked gasoline, cracked kerosene, cracked paraffine or other waxes, cracked heavy oils, etc.

Unsaturated organic compounds other than hydrocarbons may also be used and may, for some purposes, give improved results. Examples of such compounds are the oxygen-bearing unsaturated compounds, such as the unsaturated alcohols, aldehydes, ketones, ethers, acids, esters and salts; and more specifically, allyl alcohol, acrolein, crotonaldehyde, acrylic acid, crotonic acid, oleic acid, di-allyl ether, di-allyl ketone, butyl and amyl acrylate, crotonate and oleate, sodium oleate, aluminum oleate.

In addition to the unsaturated compounds above described, certain unsaturated cyclic compounds are also of use, such as cyclo-hexene and its derivatives.

*Aromatic compounds*

The organic ring compounds may be classified as follows:

Table No. 1

A. "Carbon ring" type compounds
  (a) of the aromatic, or allied type, including benzene, naphthalene, anthracene, and their derivatives; also compounds of the bridged ring type, such as the terpenes, and related compounds.
  (b) of the class including the cycloparaffins, cyclo-olefines, etc. Examples of this class are the following:
    (1) Hydrogenation products of benzene (e. g. cyclohexane, cyclohexene, cyclohexadiene).
    (2) Hydrogenation products of naphthalene (e. g. decahydronaphthalene, tetrahydronaphthalene, etc.)
    (3) Naphthenes, naphthenic acid, etc.
  (c) of mixed type such as hydrindene, hydranthracene, etc.

B. "Heterogeneous ring" type compounds
  (a) of the aromatic or allied type including pyridine, quinoline, etc, and their derivatives.
  (b) other types such as furan, thiophene, pyrrole, etc. and their derivatives.

The organic ring compounds which are preferred for my purpose are those of the aromatic type (A (a) and B (a) of the table above). These may be further classified as follows:—

Table No. 2

I. Hydrocarbons
  (A) Benzene and its homologs such as toluene, xylene, cymene.
  (B) Polyphenyls such as diphenyl, diphenyl benzene, and homologs of them such as phenyl toluene.
  (C) Condensed ring hydrocarbons
    (1) Naphthalene and its homologs, such as the methyl naphthalenes.
    (2) Phenanthrene and anthracene and their homoglos such as the mono- and dimethyl, the propyl and iso-propyl, substitution products, e. g. retene.
    (3) Chrysene and picene and their homologs.
  (D) Compounds resulting from substitution of aryl groups in compounds of Classes (A), (B) and (C), e. g., di-benzyl, di-naphthyl, phenyl naphthalene, the polyphenylmethanes, etc.
  (E) Bridged ring hydrocarbons such as the terpenes and related compounds including pinene, camphene and limonene.

II. Heterocyclic compounds
  (See Table No. 1, under B(a) and B(b), for examples)

III. Substitution products (othen than homologs) of compounds of Classes I and II.
  (A) Oxygen-bearing substitution products (See Table No. 3 below, for further classification)
  (B) Halogen-bearing substitution products
  (C) Other substitution products, such as those resulting from substitution of the following groups:
    Amino, and subsituted amino groups
    Imino
    Azo
    Hydrazo
    Hydrazine
    Nitrile
    Isonitrile
    Mercapto
    Sulphide
    Polysulphide
    Thiocyanate
    Isothiocyanate IV. Derivatives of the compounds included in Classes I, II, and III resulting from additon reactions, such as hydrogenation, halogenation, etc.

Examples of such compounds are the hydronaphthalenes, phenyl cyclohexane, phenyl cyclohexanol, cyclohexyl phenol.

Attention is called to the fact that certain of the compounds may belong to more than one class; as, for example, the halogenated phenols which belong in Class III (A) and III (B), or the halogenated amino phenols, Class III (A), (B) and (C).

The oxygen-bearing aromatic compounds (Class III (A)) of Table No. 2 are of particular importance, and are, therefore, classified in further detail according to the nature of the attachment of the oxygen to the molecule, viz:—

Table No. 3

I'. Directly attached to one or more carbon atoms, as in the case of:
  (1') Ethers and analogous compounds
  (2') Compounds containing the $\equiv C-OH$ radicle, such as alcohols and other derivatives of carbinol (including phenols, cresols, naphthols, etc.)

(3') Compounds containing the carbonyl (=C=O) radicle, such as aldehydes, ketones, organic acids, esters and salts of organic acids, thio-acids and esters of thio-acids (4') Compounds in which oxygen forms a part of the ring structure, e. g., furan and its derivatives, anthraquinone, etc.

II'. Indirectly attached through the means of some other atom, i. e., in the form of an inorganic radicle, e. g.

Amide
Arsenate
Arsenite
Chlorate
Chlorite
Cyanate
Hydroxylamine
Hypochlorite
Nitrate
Nitrite
Nitro
Nitroso
Oxime
Perchlorate
Phosphate
Phosphite
Sulphate
Sulphite
Sulphinic acid
Sulphone
Sulphonic acid
Sulphoxide
Thio-sulphate
Thio-phosphoric The products resulting from the reaction of unsaturated compounds with oxygen-bearing ring compounds are, in general, superior to corresponding oxygen-free compounds, probably as a result of the tendency of oxygen-bearing compounds to be strongly adsorbed on metal surfaces. It is to be noted that the products of reaction of oxygen-bearing unsaturated compounds with aromatic compounds are to be preferred for the same reasons.

The products resulting from the reaction of unsaturated compounds with halogen-bearing ring compounds constitute a class which are very effective in thin film lubrication, because of their ability to prevent siezing or scoring of bearing surfaces subjected to extreme pressures. Such compounds are most effective when oxygen is also present in the molecule; as, for example, the products resulting from the reaction of unsaturated compounds such as cracked kerosene with halogenated oxygen-bearing aromatic compounds such as chlorinated diphenyl ether, or the chlor aryl phosphates, e. g. the tri-chlorphenyl phosphates.

In addition to the halogen-bearing compounds, organic derivatives of any of the inorganic oxy-acids are also suitable for obtaining products useful in extreme pressure lubrication. Such products may be formed by the reaction either of unsaturated aliphatic derivatives of such acids, (e. g. allyl esters of sulphuric and phosphoric acids) with organic ring compounds, or of aryl derivatives of such acids (e. g. tricresyl phosphate) with unsaturated compounds.

In making use of halogen-bearing compounds, for most purposes it is desirable that the halogen be attached to a carbon atom which is part of a benzenoid ring structure to prevent the corrosive effect resulting from the easier hydrolysis of other halogen compounds to form hydro-halogen acids. However, where very extreme pressures are encountered, it may be necessary to employ more corrosive materials. In the latter case, the halogen addition products of aromatic compounds are particularly useful, because the degree of reactivity of the combined halogen may be easily controlled.

It may be noted that halogen-bearing products may also be obtained by first reacting the unsaturated compound with the ring compound, and then halogenating. This is usually the preferred method of preparing halogen-bearing products except when it is desired to have the halogen attached to a benzenoid structure.

It will be noted that the above referred to halogen-bearing compounds are of the type which contain a substantial amount of halogen.

The classification of the unsaturated compounds and of the organic ring compounds is sufficiently broad so that the two classes of compounds overlap. There are certain compounds belonging to both classes, as indicated by this overlapping, which are suitable for either use, for example, an aromatic compound containing a double-bonded pair of carbon atoms in a side chain may be used either as the unsaturated compound or as the organic ring compound in carrying out the reaction in the presence of aluminum chloride.

The following table gives typical examples of the unsaturated compounds and of the organic ring compounds which are suitable for use in carrying out the above reaction in the production of compounds suitable for use in the field of lubrication in accordance with this invention.

*Table No. 4*

| Typical unsaturated compounds | Typical organic ring compounds |
|---|---|
| Ethylene. | Benzene. |
| Propylene. | Toluene. |
| Isopropylene. | Xylene. |
| n-Butylene. | Ethyl benzene. |
| Isobutylene. | Naphthalene. |
| Polymerized butylenes. | Ethyl naphthalene. |
| Polymerized pentenes. | Anthracene. |
| Polymerized hexenes. | Retene. |
| Cracked gasolene. | Diphenyl. |
| Cracked kerosene. | Diphenyl ether. |
| Cracked waxes. | Triphenyl phosphate. |
| Cracked heavy oils. | Tricresyl phosphate. |
| Cracked petroleum. | Cyclohexane. |
|  | Phenyl cyclohexane. |
|  | Hydro-naphthalenes. |
|  | Chlor-naphthalenes. |
|  | Chlor-benzenes. |
|  | Chlor-diphenyl. |
|  | Chlor-diphenyl oxide. |

*Uses and advantages*

In addition to the advantages attained by the use of certain products contemplated by this invention to increase the film strength of lubricating oils or as lubricants possessing high film strength, other advantages may be obtained as follows:

The compounds in general resulting from the condensation reaction of the type considered herein are extremely stable and therefore resistant to decomposition, oxidation and to gum forming or sludge forming reactions especially when used as crank case lubricants in internal combustion engines. In general the class of products which contain long chain structures and/or multiple chain structures when present in liquids reduce the rate of change of viscosity with the temperature and usually have a tendency to prevent precipitation of crystalline or gelatinous materials such as waxes on chilling. Lubricants resulting from the use, either pure or mixed with other lubricating oils, of such products, therefore have the advantages of improved viscosity index and lowered pour point.

It has been found that certain of the compounds above described, either alone or in combination with other materials such as lubricating oils, organic oxygen compounds and organic halogen compounds, are capable of reducing the rate of wear of bearing surfaces, particularly during thin film lubrication and especially when one of the bearing surfaces is of a so-called bearing metal type such as babbitt, brass and bronze. This effect may, in some cases, be independent of the property also possessed by some of such materials of reducing friction, that is, reducing power losses in bearings.

Certain compounds which are particularly suitable for increasing the film strength of lubricating oils when added in small amounts, for example highly chlorinated naphthalene, have the disadvantage of being relatively insoluble in mineral oils, particularly at low temperatures. The oil solubility of these materials may be increased by reacting them with unsaturated compounds as disclosed herein, as for example in reacting hexachlor naphthalene with ethylene to produce poly-ethyl chlor-naphthalenes which are completely miscible with mineral lubricating oils.

Since the addition of compounds of the class including the above enumerated will usually reduce the viscosity of the oil base to which the same are added, if a large percentage of such compounds are added, there will be a tendency to destroy "thick-film" lubrication because of the reduction in viscosity of the composition. If an excessive quantity of such compounds are added, all of the lubrication will then be of the "thin-film" type and therefore produce a decided increase in the total amount of friction developed.

My invention, therefore, contemplates adding to a suitable oil base halogenated carbon compounds having a boiling point over 140 degrees C. and in proportions from .10% to 20% of the total composition.

Extremely active compounds may be effective to accomplish the purposes of this invention when present in amounts even less than the above referred to minimum amount of 0.10%.

Other modes of applying the principle of the invention may be employed instead of the one explained, change being made as regards the method herein disclosed, provided the step or steps stated by the following claim or the equivalent of said stated step or steps be employed.

I therefore particularly point out and distinctly claim as my invention:

A lubricating composition containing as a principal lubricating constituent a major amount of mineral lubricating oil with the properties of such composition affecting its use as a lubricant improved by incorporating therein a minor amount, based on the amount of mineral oil, of a compound containing a substantial amount of halogen, which compound is a halogenated alkylated toluene.

CARL F. PRUTTON.